United States Patent [19]

Adams, III et al.

[11] 4,280,665
[45] Jul. 28, 1981

[54] SOLIDS ELIMINATOR

[76] Inventors: Clyde O. Adams, III, P.O. Box 387; James F. Fitch, Jr., P.O. Box 363, both of Ashford, Ala. 36312

[21] Appl. No.: 34,909

[22] Filed: Apr. 24, 1979

[51] Int. Cl.³ ................ B02C 23/10; B02C 23/14; B02C 23/18
[52] U.S. Cl. .......................... 241/62; 241/38; 241/80; 241/81
[58] Field of Search .............. 241/75, 77, 80, 81, 241/68, 38, 62

[56] References Cited

U.S. PATENT DOCUMENTS

| | | | |
|---|---|---|---|
| 2,692,677 | 10/1954 | Bosqui et al. | 241/80 |
| 2,793,119 | 5/1957 | Moldenhauer | 241/186 X |
| 3,982,699 | 9/1976 | Jager | 241/80 X |

Primary Examiner—Richard B. Lazarus
Attorney, Agent, or Firm—Harvey B. Jacobson

[57] ABSTRACT

Liquid fertilizer is produced by mixing dry fertilizer components with water. The combination is introduced into a first cyclone separator which removes the larger chunks of material from the mixture and discharges them into a crusher containing a revolving paddle wheel. The smaller chunks and the solution are passed to a second cyclone separator where the smaller chunks are removed and passed to the same paddle wheel. The solution containing the dissolved material is passed on to a holding tank. The chucks which were passed to the paddle wheel are broken up by impact with the paddle wheel and the paddle wheel housing and thereafter fall through a discharge chute and become remixed with fluid from the holding tank or storage vat. The fluid and crushed particles are recirculated through the cyclones and crusher or impactor until all particles have become dissolved into the solution.

4 Claims, 4 Drawing Figures

SOLIDS ELIMINATOR

BACKGROUND OF THE INVENTION

1. Field of the Invention

This invention relates to devices for separating solid particles from fluid solutions and reducing the mass of the particles until they dissolve into solution.

2. Discussion of Related Art

In the manufacture of liquid fertilizer, it is necessary to cause dry fertilizer products such as phosphate, nitrogen, pot ash and lime to mix with and dissolve in water to produce the fertilizer. It is beneficial to reduce the size of the particles of dry fertilizer material in order to accelerate the dissolving of the solid materials.

Toward the end of reducing the size of chunks of fertilizer material, several systems have been suggested. For example, U.S. Pat. No. 1,739,732, issued Dec. 17, 1929, to Parrish, discloses a process wherein dry fertilizer material is passed through a series of screens having progressively smaller apertures. Associated with each screen is a crushing device which is especially adapted for handling material rejected by that screen. U.S. Pat. No. 3,532,276, issued Oct. 6, 1970, to Dunn, shows a drum screen for fertilizer wherein granular or particulate materials are fed into an upper end of a rotating drum mounted at an inclination to the horizontal. The drum is formed from a screen having progressively larger openings toward the lower end of the drum. Coarser particles flow down and through the coarser screen and into a device which comminutes the larger particles.

Systems which use cyclone separaters for classifying particles by size are also known. For instance, U.S. Pat. No. 3,543,932, issued Dec. 1, 1970, to Rastatter shows a separating device wherein paper pulp suspensions are fed to a plurality of parallel cyclone separators. The accepted stock is transferred to a holding tank while the rejected stock is fed to a common conduit. The conduit is connected to the input of a further cyclone separator with the accepted stock therefrom being returned to the original cyclone separators and the rejected stock therefrom being transferred to a waste receptacle. U.S. Pat. No. 3,794,251, issued Feb. 26, 1974, to Williams, shows an arrangement whereby a fluid bed of material is established in a mill by an air circulating blower creating a flow through a venturi of a velocity sufficient to suspend fines in the incoming material while allowing the larger and heavier particles to separate out and pass down through the venturi to be impacted by the mill hammers and forcibly returned through the venturi after being reduced in size. The particles suspended in the air flow are transported to a cyclone separator for removal in the usual manner so that substantially clean air is returned to the venturi.

SUMMARY OF THE INVENTION

The present invention comprises an apparatus for reducing the particle size of dry fertilizer components entrained in a liquid flow for insuring the complete dissolution of the particles into the liquid. The particle and liquid material is introduced into the inlet of a first cyclone separator. Therein the larger of the particles are separated out and channeled to an impactor for reducing the size thereof. The liquid and the small particles exit through the top of the separator and are channeled to the inlet of a second cyclone separator. In the second separator, the remainder of the particles are removed from the liquid. These particles are also channeled to the impactor. The liquid material is channeled from the top of the separator to a holding vat. The impactor comprises a rotating wheel having a plurality of radially extending hammers or paddles thereon. The particles which enter the impactor are struck by the paddles and also impact against the housing of the device. The particles are thus reduced in size and exit through the bottom of the impactor. The impactor outlet is connected to piping leading from the storage vat. The smaller particles are thus re-introduced into the liquid fertilizer and pumped to the inlet of the first cyclone separator along with fresh water and dry fertilizer ingredients. In this manner, the dry fertilizer ingredients are continuously reduced in size until they completely dissolve into the solution.

Accordingly, one object of the present invention is to provide a device whereby dry fertilizer ingredients can be completely dissolved thereby forming a liquid fertilizer product.

A further object of the present invention is to provide a solids eliminator which can remove substantially all of the solid particles from the liquid fertilizer in order to allow these particles to be further reduced in size, thus facilitating their dissolution in the liquid.

A still further object of the present invention is to provide a solids eliminator whereby series connected cyclone separators have their high density outlets connected to a common impactor for reducing the particle size from the high density outlets.

One even still further object of the present invention is to provide a solids eliminator which includes an impactor having a rotary wheel with a plurality of attached hammers or paddles for promoting active disintegration of the particles entering the impactor.

Yet another still further object of the present invention is to provide a solids eliminator whereby the particles removed from the liquid fertilizer are reduced in size and re-introduced into the liquid fertilizer for passage through the device again.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
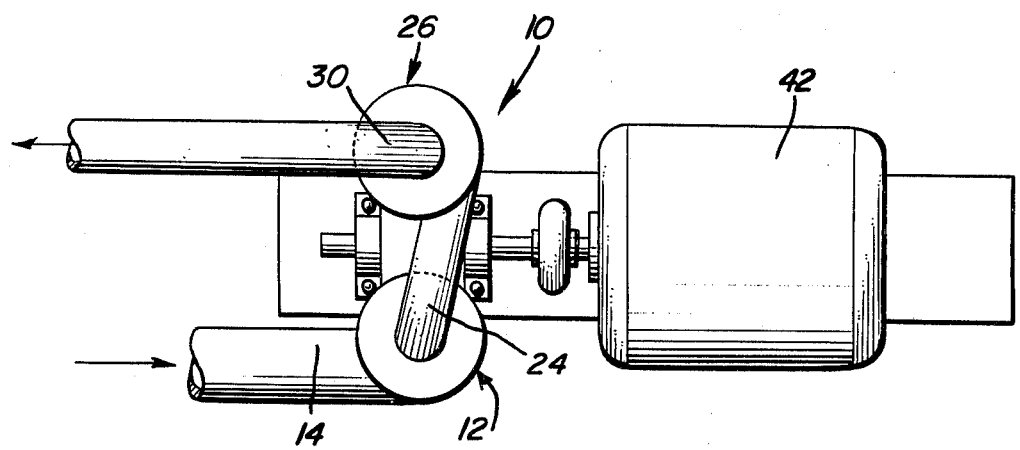
FIG. 1 is a plan view of the solids eliminator of the present invention.
Figure 2:
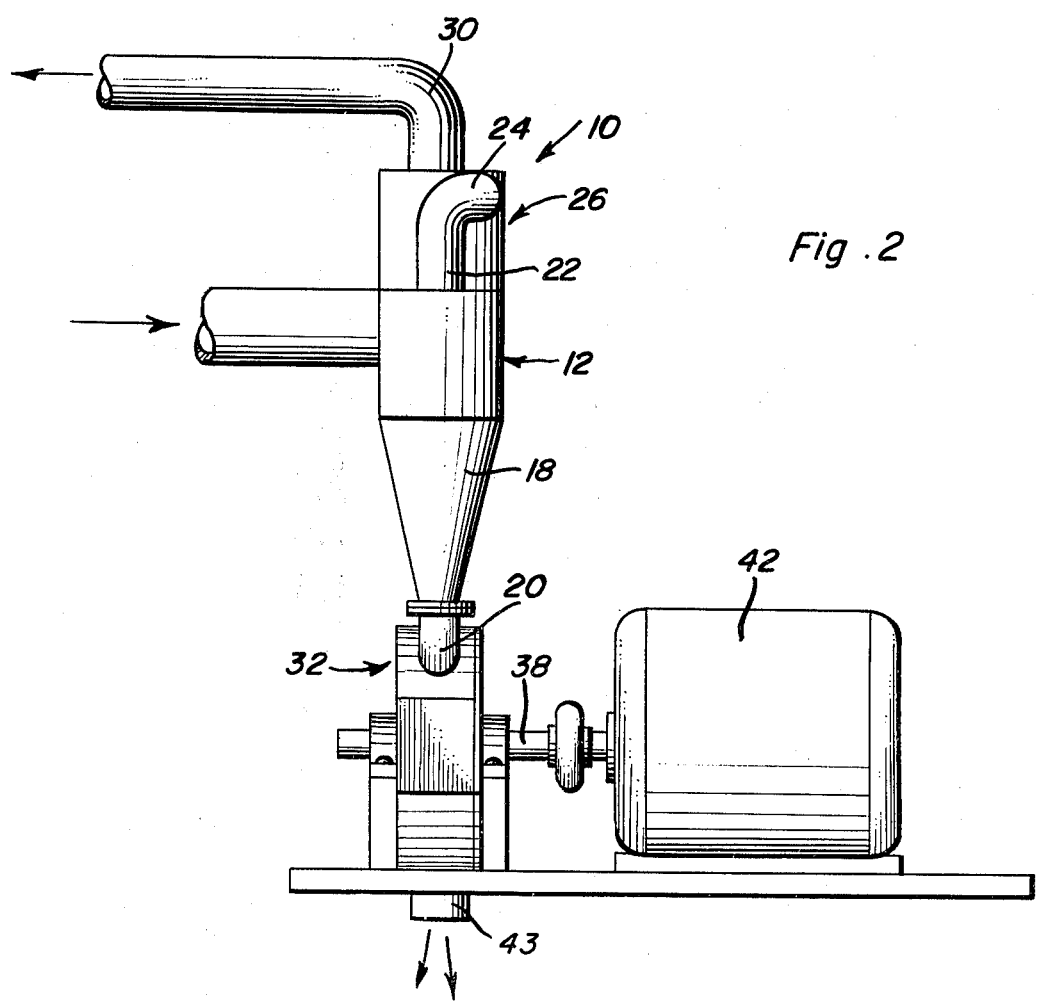
FIG. 2 is a side elevational view of the solids eliminator of the present invention.

Now with reference to the drawings, the solids eliminator generally referred to by the reference numeral 10 will be set forth in detail. With reference to the figures, it can be seen that the solids eliminator includes a first cyclone separator 12 having inlet 14. The cyclone separator 12 is of conventional design wherein the inlet 14 is tangentially positioned at the top of the separator. A mixture of liquid and solid particles is introduced into the separator through inlet 14 under high pressure. Due to the tangential positioning of the inlet, the mixture follows a helical path toward the lower portion of the separator thereby forming a vortex within the separator. The vortex extends downward into the lower conical portion 18 where it is compressed. Due to centrifugal force caused by the spiral action of the vortex, the heavier particles are forced to the outside of the vortex and fall through first outlet 20. The lighter materials are forced toward the center of the vortex and, due to the conical shape of section 18, are forced upward in a spiral motion and are channeled to second outlet 22.

Outlet 22 of cyclone separator 12 is connected directly to tangential input 24 of a second cyclone separator, generally referred to by the numeral 26. Separator 26 is identical in function to separator 12 and includes a first outlet 28 and a second outlet 30.

Both separator 12 and separator 26 are positioned vertically above impactor 32. Impactor 32 includes a housing 34 which has two inlets which inlets are connected respectively to the outlets of separators 12 and 26. Contained within housing 34 is wheel 36 mounted on shaft 38. Wheel 36 includes a plurality of hammers or paddles 40 spaced about its periphery. Wheel 36 and accordingly hammers 40 are rotated at a high rate of speed, for example 3,600 rpm, through shaft 38 which is attached to and rotated by motor 42. The hammers 40 impact against the particles falling through outlets 20 and 28 pulverizing and disintegrating them. The particles are also thrown against housing 34 and fractured into yet smaller pieces. The fractured and disintegrated particles will eventually fall through exhaust 43 which is disposed at the bottom of housing 34.

Figure 3:
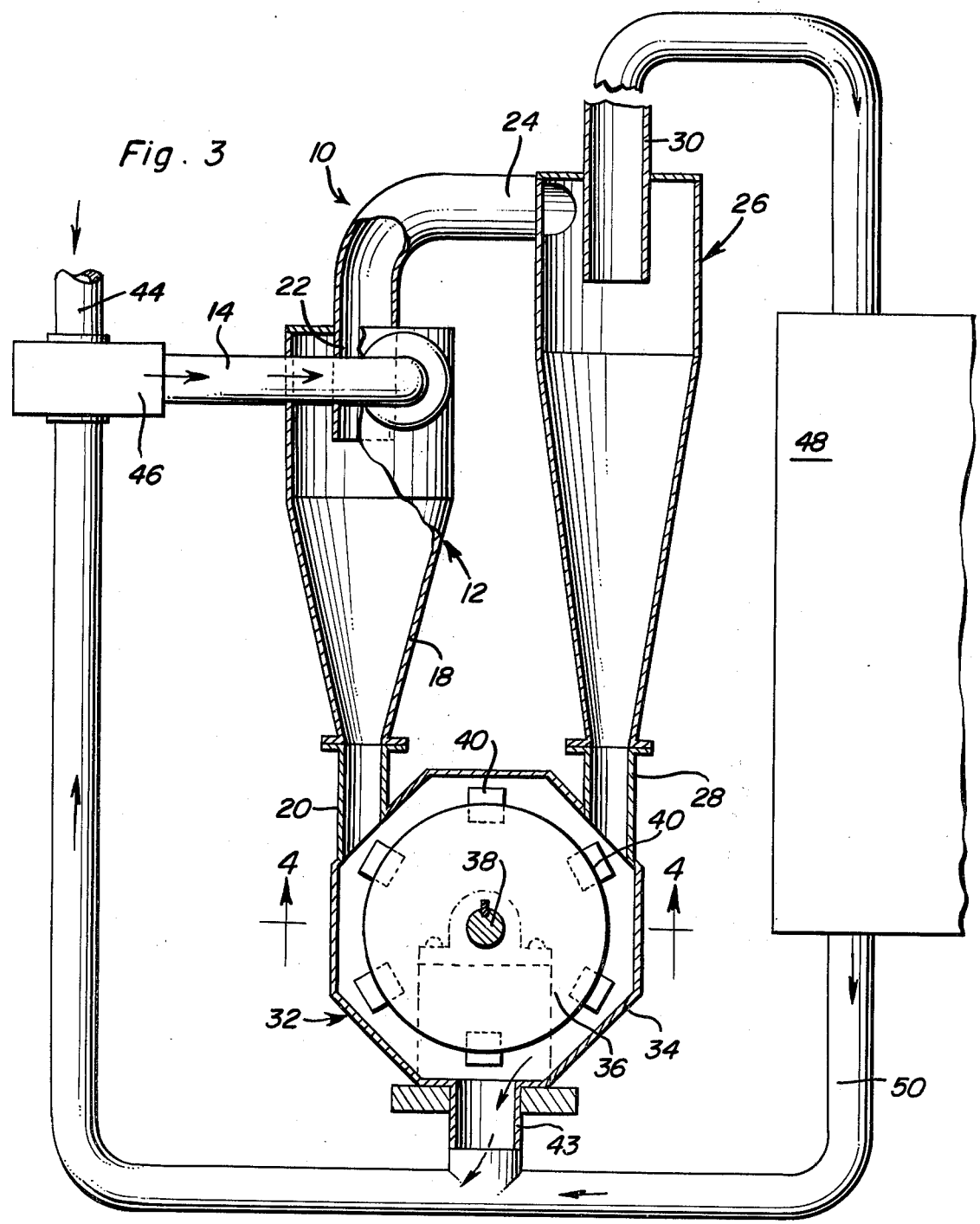
FIG. 3 is an elevational sectional view of the solids eliminator showing the eliminator as one element of a recirculation system.
Figure 4:
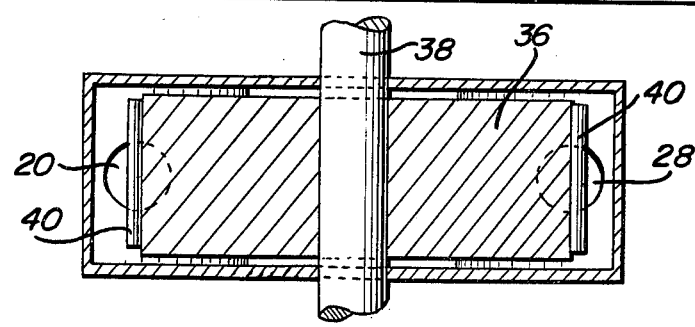
FIG. 4 is a bottom plan sectional view taken substantially along a plane passing through section line 4—4 of FIG. 3.

Now with particular reference to FIG. 3, it can be seen that the over-all system in which the solids eliminator is to be utilized includes a main inlet 44. Inlet 44 is connected to a source of water and dry fertilizer products, such as phosphate, nitrogen, potash, and lime. The dry fertilizer products are mixed with the water and drawn into inlet 44 through the action of pump 46. Through agitation caused by the pump 46 certain of the particles of dry fertilizer product dissolve and enter solution with the water forming the desired liquid fertilizer. When the combination of liquid fertilizer and dry fertilizer particles are pumped through inlet 14 into the first cyclone separator 12, approximately 70% of the dry fertilizer products are separated from the mixture and deposited into impactor 32 for further disintegration in order to facilitate the dissolution thereof. However, separator 12 does not eliminate all of the solid particles from the solution. The smaller particles which are entrained in the solution travel upward through outlet 22 and into inlet 24 of cyclone separator 26. Cyclone separator 26 effects the removal of all of the remaining particles from the liquid fertilizer and channels them through outlet 28 and into the impactor 32. Accordingly, liquid fertilizer having no particles entrained therein exits the second cyclone separator 26 through outlet 30 and is channeled to storage vat 48. A portion of the completed fertilizer product stored in vat 48 is channeled through pipe 50 which connects with the outlet 43 of impactor 34. The particles which were deposited in the impactor 32 and disintegrated therein exit through outlet 43 and are recombined with the liquid fertilizer travelling through pipe 50. This combined mixture is drawn by pump 46 into initial inlet 14 of cyclone separator 12. In this manner, the particles of dry fertilizer are recirculated and sent through impactor 32 until they are reduced to a size sufficiently small to insure that they will dissolve in the liquid fertilizer solution. Meanwhile, the liquid fertilizer stored in vat 48 is ready for use and can be removed for transporation to other facilities.

When making liquid fertilizer from dry fertilizer products combined with water, whether the mixture is ammoniated or not, certain of the dry fertilizer products tend to be more easily separated from the solution than others. For this reason, when the mixture is introduced into the first cyclone separator 12, certain of the fertilizer products are forced through outlet 22. Accordingly, if second cyclone separator 26 were not used, certain of the dry fertilizer products would never be completely dissolved into solution and would remain in particulate form in the finished product. Thus, it is necessary for two cyclone separators to be connected in series with the second cyclone separator insuring that all of the particulate matter entrained in the liquid fertilizer is removed from the solution and sufficiently reduced in size to insure that it will eventually dissolve. Since all of the solid particles are removed from the liquid fertilizer, they can more easily be fractured by impactor 32 than would be the case if they were still in the solution.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A solid eliminator for effecting elimination of solid particles from a solid and liquid combination and pulverizing the solid particles comprising, in combination:

a first cyclone separator having an inlet connected to a source of dry fertilizer ingredients and liquid and receiving the mixed liquid and solid particles, a first outlet for discharging denser materials from the separator and a second outlet for discharging less dense materials from the separator;

a second cyclone separator having an inlet connected to the second outlet of said first cyclone separator and a first outlet for discharging denser material and a second outlet for discharging less dense material;

an impactor means having a pair of inlets connected respectively to the first outlet of said first cyclone separator and said first outlet of said second cyclone separator for pulverizing the material entering the impactor means, said impactor means including a plurality of paddles attached to a common shaft and a motor attached to said shaft for rotating said shaft together with said paddles at a high rate of speed for pulverizing material received thereinto; and an outlet means for discharging said pulverized material, said outlet means of said impactor means being connected to the inlet of said first cyclone separator; and a return line connected from said second outlet of said second cyclone separator to said outlet means of said impactor means for remixing the less dense material with the pulverized material.

2. The structure of claim 1 and further including a holding vat disposed in said return line for storing the less dense material exiting from said second outlet of said second cyclone separator.

3. An apparatus for producing liquid fertilizer from solid fertilizer materials mixed with fluid, said apparatus comprising: a first cyclone separator having an inlet connected to a source of dry fertilizer ingredients and liquid for receiving a mixture of these components and separating a portion of the undissolved dry fertilizer ingredients from the liquid; a first discharge port connected to said first cyclone separator; a second cyclone separator having an inlet connected to said first discharge port of said first cyclone separator, said second cyclone separator causing the removal of the remainder of said solid fertilizer materials from said liquid; a second discharge port connected to said first cyclone separator for discharging solid materials therefrom and a second discharge port connected to said second cyclone separator for discharging solid material therefrom; an impactor means connected to said second discharge ports of said first and second cyclone separators for pulverizing said solid material discharged therefrom, said impactor means including a housing surrounding a rotating wheel having a plurality of radially extending hammers connected thereto, said wheel being mounted on a shaft connected to a motor for rotating said wheel at a high rate of speed, said housing having a pair of inlets entering the housing tangentially of said wheel, with said inlets being connected respectively to said second discharge ports of said first and second cyclone separators; a liquid discharge port connected to said second cyclone separator for discharging said liquid, and a return line connected from said liquid discharge port to said first cyclone separator inlet.

4. The apparatus of claim 3 and further including a circulation means for mixing said pulverized material with liquid and recirculating it through said cyclone separators.

* * * * *